United States Patent Office
3,094,511
Patented June 18, 1963

3,094,511
WHOLLY AROMATIC POLYAMIDES
Harold Wayne Hill, Jr., Stephanie Louise Kwolek, and Wilfred Sweeny, Wilmington, Del., assignors to E. I. du Pont de Nemours and Company, Wilmington, Del., a corporation of Delaware
No Drawing. Filed Nov. 17, 1958, Ser. No. 774,156
5 Claims. (Cl. 260—78)

This invention relates to a novel polymer and shaped structures prepared therefrom. More specifically, it relates to a high molecular weight aromatic polyamide having an unusually high melting point.

It is known that diamines may be reacted with dibasic acids to form polyamides. These polymers have found wide commercial acceptance because they can be formed into strong abrasion-resistant fibers and films. Known polyamides, however, are deficient in several desirable properties. For example, polyamides disclosed in U.S. Patent 2,130,948 have relatively low melting points, and degrade rapidly in the presence of air at temperatures as low as 200° C. More important, these polyamides lose a substantial portion of their strength at temperatures much lower than their melting points. Similarly, polyamides disclosed in U.S. Patent 2,244,192 show little tendency to crystallize and also soften at temperatures considerably below their melting points besides exhibiting an undesirable amber color rendering them unsuitable for many purposes. Cold-drawn filaments prepared from these polyamides tend to contract at temperatures considerably below their melting points and degrade rapidly at their melting temperatures. There has been a need for a high molecular weight polyamide which is strong and stable at high temperatures and suitable for forming into filaments and films having water-white clarity.

It is an object of this invention to produce a new high molecular weight aromatic polyamide formable into films and filaments. Another object is to provide a high molecular weight aromatic polyamide having an inherent viscosity of at least 0.6. Another object of this invention is to provide a high molecular weight wholly aromatic polyamide having an inherent viscosity of at least 0.6 and characterized by water-white clarity and a melting point above about 300° C. These and other objects will become apparent from the following specification and claims.

In accordance with the present invention, there is provided a high molecular weight polymer characterized predominantly by the recurring structural unit

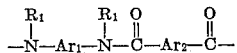

wherein $R_1$ is hydrogen or lower alkyl and wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not from a polyamide during polymerization.

The high molecular weight polymer of this invention is termed "an aromatic polyamide." This term refers to a polymer wherein repeating units are linked by a carbonamide group, i.e., the

radical ($R_1$ being the same as above indicated), the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. The term "aromatic ring" means a carbocyclic ring possessing resonance. Exemplary aromatic radicals have the following structural formulas

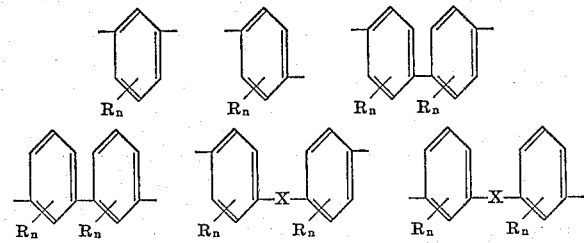

in which R is preferably a lower alkyl, lower alkoxy, or halogen group, $n$ is a number from 0–4, inclusive, and X is preferably one of the groups of

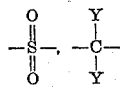

and —O—, in which Y is a hydrogen or a lower alkyl group. X may also be a lower alkylene or lower alkylene dioxy group although these are somewhat less desirable. R may also be a nitro, lower carbalkoxy, or other non-polyamide-forming group. All of these aromatic radicals are divalent and meta or para oriented, i.e., the unsatisfied bonds of the radicals (the "chain-extending bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. Preferable, however, are high molecular weight polymers in which the aromatic radicals are unsubstituted or contain only lower alkyl groups attached to any one ring. The term "non-polyamide-forming groups" refers to groups which do not form polyamides during the polymerization reaction herein disclosed. The term "chain-extending bond" refers to any bond in the polyamide which, if broken, would decrease the length of the polymer chain.

High molecular weight polymers of this invention are prepared by reacting an aromatic diacid chloride with an aromatic diamine, the acid groups of the diacid chloride and the amine groups of the diamine being meta or para oriented relative to each other, at low temperatures (below 100° C.).

The diacid chloride of the dibasic aromatic acid useful as a reactant in the polymerization of the present invention includes compounds of the formula

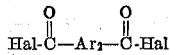

wherein $Ar_2$ is a divalent aromatic radical, i.e., it contains resonant unsaturation, and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing less then five carbon atoms.

Diacid chlorides which may be utilized to prepare the polyamides of this invention include isophthaloyl chloride and lower alkyl isophthaloyl chlorides, such as methyl-, ethyl-, propyl-, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. The total number of carbon atoms in the substituents attached to the aromatic ring should not exceed nine. It is not necessary that all of the alkyl substituent groups be the same because compounds such as 2-methyl-4-ethyl isophthaloyl chloride and 2-methyl-4-ethyl-5-propyl isophthaloyl chloride may be utilized, the total number of carbon atoms in all the substituent groups (non-polyamide-forming groups) attached to the aromatic ring in the latter two compounds being 3 and 6, respectively. In place of an alkyl group, the aromatic ring in isophthaloyl chloride may be substituted with one or more lower alkoxy groups such as, for example, methoxy-, ethoxy-, propoxy-, butoxy-, etc., isophthaloyl chlorides. As with alkyl-sustituted isophthaloyl chlorides it is desirable that the total number of carbon atoms in the alkoxy groups attached to the aromatic ring be less than about five, but it is not necessary that all of the alkoxy groups be the same. Representative of such compounds are dimethoxy-, trimethoxy-, tetramethoxy-, and diethoxy-isophthaloyl chlorides, and 2-methoxy-4-ethoxy isophthaloyl chloride. Halogen-substituted isophthaloyl chlorides as exemplified by chloro-, bromo-, and fluoro-isophthaloyl chlorides may be used. More than one halogen may be attached to the aromatic ring and dihalo isophthaloyl chlorides, such as dichloro-, dibromo-, difluoro-, or chlorobromo-, chlorofluoro-isophthaloyl chlorides are useful as are similar trihalo and tetrahalo isophthaloyl chlorides. The halogens in these compounds may be the same or different as in the case of the dihalo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups so long as the total number of carbon atoms in the substituents attached to the aromatic ring does not exceed nine. Thus, it will be apparent that the aromatic radical of the isophthaloyl chloride may contain one or more or any combination of lower alkyl, lower alkoxy, halogen, nitro, phenyl, lower carbalkoxy, or other non-polyamide-forming groups.

In addition to isophthaloyl chlorides and substituted isophthaloyl chlorides specified above, corresponding unsubstituted and substituted terephthaloyl chloride may also be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed nine. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc., terephthaloyl chlorides, chloro-, bromo-, dichloro-, chlorobromo-, etc., terephthaloyl chlorides, and nitro and lower carbalkoxy-terephthaloyl chlorides.

In addition to the single ring diacid chlorides specified above, multiple ring diacid chlorides in which the acid chloride groups are oriented meta or para with respect to each other are also useful in this invention. Exemplary of such compounds are 4,4'-oxydibenzoyl chloride, 4,4'-sulfonyldibenzoyl chloride, 4,4'-dibenzoyl chloride, 3,3'-oxydibenzoyl chloride, 3,3'-sulfonyldibenzoyl chloride, and 3,3'-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

The diamines useful as reactants in forming the polymer of this invention are compounds of the formula $H_2N-Ar_1-NH_2$ and $R_1-HN-AR_1-NH-R_1$ where $R_1$ is hydrogen or lower alkyl and $Ar_1$ is a divalent aromatic radical as defined above and the $-NH_2$ and $-NHR$ groups are oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy as mentioned above. The aromatic nucleus of the diamines may be identical to any of the aromatic radicals mentioned above for the diacid chlorides, and the diamine utilized in any given instance may contain the same or different aromatic radical as the diacid chloride utilized. The total number of carbon atoms in the substituent groups attached to any aromatic ring should not exceed nine.

Exemplary diamines which may be utilized in this invention include meta-phenylene diamine and lower alkyl substituted meta-phenylene diamine such as methyl-, ethyl-, propyl-, etc., meta-phenylene diamine; N,N'-dimethylmetaphenylene diamine, N,N'-diethylmetaphenylene diamine, etc. There may be more than one alkyl group attached to the aromatic ring as in the case of dimethyl, trimethyl, tetramethyl, diethyl, triethyl, and triisopropyl meta-phenylene diamine. The alkyl substituent groups need not be the same because compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy-, ethoxy-, propoxy-, butoxy-, etc., meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenylene diamine as exemplified by chloro, bromo, and fluoro meta-phenylene diamine may be utilized. More than one halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups so long as the total number of carbon atoms in the substituents attached to an aromatic ring does not exceed nine.

In addition to meta-phenylene diamine and substituted meta-phenylene diamines specified above, the corresponding unsubstituted and substituted para-phenylene diamine compounds may also be used. There may be one or more or a combination of substitutents attached to the aromatic ring so long as the total number of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4'-oxydiphenyldiamine, 4,4'-sulfonyldiphenyldiamine, 4,4'-diphenyldiamine, 3,3'-oxydiphenyldiamine, 3,3'-sulfonyldiphenyldiamine, and 3,3'-diphenyldiamine, and the corresponding compounds in which one or both of the aromatic rings contains one or more or a combination of lower alkyl, lower alkoxy, halogen, nitro, sulfonyl, lower carbalkoxy groups and the total number of carbon atoms in the substituent groups attached to an aromatic ring does not exceed nine.

A diamine and diacid chloride are reached in accordance with this invention to produce a high molecular weight linear polyamide having a structural unit corresponding to the diamine and diacid chloride utilized. For example, para-phenylenediamine reacts with isophthaloyl chloride to produce a polymer characterized by the following structural unit.

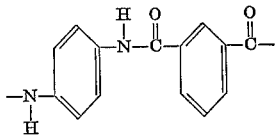

and having an inherent viscosity greater than about 0.6. Similarly, other diamines and diacid chlorides react to produce polyamides with corresponding aromatic nuclei. The structure of the polyamide is indicated by the fact that in accordance with this invention two aromatic bifunctional reactants (aromatic diacid halide and aromatic diamine) combine in equivalent amounts under very mild reaction conditions to form a polymer that is dissolved and unchanged in unreactive solvents, and is orientable and generally crystallizable in film and fiber form. The structure of the polymer is confirmed by infrared spectra analysis.

In preparing the polymers of this invention two or more aromatic diamines or two or more aromatic diacid compounds of the structures already described can be employed in place of a single diamine and single dibasic acid compound. In addition, up to about 10% polymer-forming ingredients which may or may not contain an aromatic nucleus can be included without seriously detracting from the extraordinary physical and chemical properties of the polymers of this invention. Preferably, however, the diamine and diacid compounds utilized will be wholly aromatic, thus resulting in a polymer characterized entirely by structural units with all of the nuclei containing aromatic radicals.

Polymers of this invention are characterized by an exceptionally high melting point. Whereas known polyamides melt at temperatures below about 270° C., generally the polyamides of this invention have melting points in excess of 300° C. and in many instances above 350° C. Moreover, filaments of polyamides of this invention retain their filament form at temperatures of about 300° C. Polymers of this invention are also distinguished from known polyamides in having water-white color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures, and are readily crystallizable.

The polymers of this invention find application in a wide variety of physical shapes and forms. Among the most significant of these forms are fibers and films. The useful combination of desirable physical and chemical characteristics of these polymers are unique. Fibers and films of these polymers not only possess excellent physical properties at room temperatures, but retain their strength and excellent response to work-loading at elevated temperatures for prolonged periods of time.

For many end uses it is satisfactory to employ either amorphous or crystalline fibers on films. This is particularly true when the end use in mind takes chief advantage of the high melting point and chemical stability of these polymers. Some end uses require high tenacity at normal temperatures and resistance to melting under exposure to high temperatures for short periods of time or even extended periods of time, followed by additional tensioning at lower temperatures. For these, it is found that both amorphous and crystalline fibers are suitable. However, under circumstances which require retention of outstanding physical properties such as high tenacity and high work recovery while the material is subjected to temperatures close to the melting point and dimensional stability under conditions of cyclic change in moisture or temperature or both in the environment, it is found to be preferable that the fibers and films of the present invention be in a crystalline state. Crystalline fibers and films of the polymers of the present invention are outstanding in their retention of tenacity at elevated temperatures and in their constancy of elongation-to-break under extremely high temperatures. Crystalline fibers, films, and fabrics made from crystalline fibers are also more resistant to dimensional shrinkage under conditions of cyclic wet and hot dry treatment.

The fibers and films of the present invention as normally produced are oriented by drawing or stretching. Fibers are oriented in one direction. Films can be oriented in one or two directions. Following the orientation process, it is possible and sometimes highly desirable, depending upon the end use for which the shaped article is to be employed, to crystallize the material and to increase thereby its stability under certain ambient conditions. Of course, as already indicated, the polymer can be crystallized prior to forming into fibers, films, and the like, but it is difficult to retain this crystallinity in the polymer through the process of spinning a fiber or casting a film. Therefore, it is normally desired to retain the polymer in the amorphous condition until it has been shaped into a fiber, film, or similar article and then, as needed, to orient this article and follow the orientation treatment with a crystallization step. There are several crystallization treatments known by which the shaped article can be crystallized while retaining the shape and orientation of the product, as shown in some of the examples below.

In fiber form the polymers of this invention may be used for high temperature heat and electrical insulation, protective clothing and curtains, filtration media, packing and gasketing materials, brake linings and clutch facings. In the aircraft industry these materials can be used in parachutes, fuel cells, tires, ducts, hoses and insulation. In atomic energy applications the remarkable resistance to radiation with retention of physical properties as well as thermal stability is important. Cordage for tires and conveyor belts, particularly where such materials would be subject to prolonged high temperature exposure is another application. Press cloths in the dry cleaning industry prepared from such fibers have extreme hydrolytic stability. In the form of films, these polymers may be used in automotive and aviation interior head lining materials, decorative trim, high temperature heat and electrical insulation, such as for slot liners, use in dry transformers, capacitors, cable wrappings, etc., packaging of items to be exposed to high temperature or high energy radiation while within the package, corrosion resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets or foils, mold liners or self-sustaining containers for casting low-melting (below 300° C.) fusible materials, including metals, and a variety of other similar and related uses. Valuable flexible materials similar in function to putty with outstanding high temperature stability can be made by combining fibers prepared from polymers of the present invention with flexible high-temperature polymers such as plasticized chlorotrifluoroethylene polymers.

Films formed from polymers of this invention may be stretched or otherwise oriented according to conventional procedures. Films may be oriented biaxially by stretching or rolling in both directions or by rolling in one direction and stretching in the other.

The following examples illustrate the invention. All parts and percentages are by weight unless otherwise indicated. Values of inherent viscosity are determined in sulfuric acid (sp. gr. 1.841 at 60° F.), at 30° C. at a concentration of 0.5 gram polymer per 100 cc. of solution. All polymers of this invention have an inherent viscosity of at least about 0.6 on this basis and a melting point of at least about 300° C.

EXAMPLE 1

Meta-phenylenediamine dihydrochloride in the amount of 5.4 parts is placed in a reaction vessel fitted with a high speed stirrer and a solution of 12.1 parts of triethylamine in 200 parts methylene chloride is added rapidly. Triethylamine hydrochloride is formed in situ. The mixture is stirred for one minute to dissolve the diamine salt. 6.1 parts of isophthaloyl chloride in 200 parts of methylene chloride is then added. Polymerization is completed and poly(meta-phenylene isophthalamide) is precipitated by addition of a volume of hexane equal to the volume of the reaction mass. The product is water-white and has an inherent viscosity of 1.71 and a polymer melt temperature of 375° C. It is obtained in 91% yield.

The polymer prepared as above is dissolved to a concentration of 17% in a mixture of 95 parts dimethylformamide and 5 parts lithium chloride. This solution at 128° C. is spun through a 5-hole spinneret, in which the orifice has a diameter of 0.10 mm., into an air column maintained at 225° C. Fiber, wound up at the rate of 92 yards per minute is thereafter drawn to approximately 4.75 times its original length and boiled off in water. The final fiber has a tenacity of 4.9 grams per denier, with a 30% elongation at the break.

Another sample of the same polymer is dissolved in a mixture of 95% dimethylformamide and 5% lithium chloride to give a 15% polymer solution. This solution is cast into a film. The solvent is flashed off in a hot oven at 150° C.. The resulting film is leached in hot water to remove residual dimethylformamide and salt. Test strips of the wet film are clamped in frames prior to drying in a vacuum. Physical properties of the films at various temperatures are reported in the table below:

*Table 1*

| Temperature, °C. | Tensile strength (p.s.i.) | Modulus (p.s.i.) | Percent elongation |
|---|---|---|---|
| 20 | 12,000 | 500,000 | 3–5 |
| 150 | 7,500 | 350,000 | 5–10 |
| 200 | 7,000 | 350,000 | 8–15 |

The film is also noted to have a high dielectric constant which drops off only fractionally at temperatures as high as 200° C., while commercially available insulating materials such as polyethylene or rubber are either completely destroyed or become molten at such temperatures.

In order to illustrate the non-flammable nature of the polymers, a sample of fiber such as prepared above is subjected to a standard flammability test (A.A.T.C. 45° angle test, American Handbook of Synthetic Textiles, 1st Ed. (1952), Textile Book Publishers Inc., N.Y.) along with a cotton fiber control. Both fibers are knit into tubes and exposed to an open flame until ignited, at which time the flame is removed. Test results are shown in the table below:

As can be seen, the fiber of this invention is outstandingly superior to cotton in flame resistance. In similar tests, the fibers of this invention were compared to other commercial synthetic fibers, and proved more difficult to ignite and in addition were self-extinguishing. A sample of a fabric from poly(hexamethylene adipamide) yarn was burned to the extent of ⅔ of the fabric area, while the fabric prepared from fibers of Example I was charred for less than 1/10 of its area.

Another sample of the same polymer is dissolved in a mixture of 80.75 parts of dimethylformamide and 4.25 parts lithium chloride to give a 15% polymer solution. This solution is cast into a film using a doctor blade allowing 15 mils clearance. Solvent is flashed off in a hot vacuum oven. Resulting film is oriented by hot-rolling in a direction perpendicular to the direction of casting and then hot-rolled at a 90° angle to that direction, producing a biaxially oriented film. Physical properties of this film are shown in Table 3 below.

*Table 3*

|  | Direction of first rolling | Direction of second rolling |
|---|---|---|
| Modulus, lbs./in | 900,000 | 700,000 |
| Tenacity, lbs./in | 30,000 | 22,000 |
| Elongation, percent | 10 | 4.5 |

EXAMPLE II

Poly(4-methyl-meta-phenylene isophthalamide) is made in a Waring Blendor by adding 4.06 parts of the isophthaloyl chloride in 200 parts of methylene chloride to a solution of 2.4 parts of 4-methyl-meta-phenylene diamine, 4.1 parts of triethylamine and 3.7 parts of triethylamine hydrochloride in 130 parts of methylene chloride and stirring for 10 minutes. Polymer having a water-white color, an inherent viscosity of 1.64, a polymer melt temperature of 300° C. and soluble in both dimethylformamide and dimethylacetamide, is obtained in a 76% yield. It is dry spun from dimethylformamide and the yarn drawn three times its original length. Samples of this yarn together with comparative controls are exposed, for various periods, to (A) air at 175° C. containing 5% steam, and (B) air at 175° C. containing 5% steam and 5% sulfur dioxide. Tenacities of the samples A and B are reported in Tables 4 and 5, respectively.

*Table 4*

| Yarn | Exposure time (days) | Retained tenacity (percent) |
|---|---|---|
| Poly (m-phenylene isophthalamide) | 6 | 85 |
| Poly (methyl-m-phenylene isophthalamide) | 6 | 45 |
| Poly (ethylene terephthalate) | 6 | 19 |
| Poly (hexamethylene adipamide) | 4 | (1) |

[1] Too weak to test.

*Table 2*

FLAMMABILITY OF KNIT FABRICS

| Sample | Ignition time, sec. | Total time to burn | Dimensions char zone (inches) | Type of burning | Type of residue |
|---|---|---|---|---|---|
| Fiber of Ex. I (five samples) | 3.8 | Went out (5.4 sec.) | 0.35 x 0.30 | Slow ignition negligible burning period | Crusty, hard. |
| Cotton fiber (five samples) | 2 | 13 to 430 sec. | 1.5 x 6 sample burned completely. | Rapid ignition, quick flaming, glowing char slowly disintegrates. | Feathery. |

Table 5

| Yarn | Exposure time (days) | Retained tenacity (percent) |
|---|---|---|
| Poly (m-phenylene isophthalamide) | 6 | 70 |
| Poly (methyl-m-phenylene isophthalamide) | 3 | 49 |
| Poly (ethylene terephthalate) | 1 | (1) |
| Poly (hexamethylene adipamide) | 1 | (1) |

1 Too weak to test.

EXAMPLE III

Fibers of poly(meta-phenylene isophthalamide) as prepared in Example I above are shown by X-ray diffraction examination to be amorphous (see FIGURE 1). The amorphous yarn exhibits good physical properties as already indicated and is quite resistant to shrinkage upon treatment with boiling water. However, this amorphous yarn shrinks considerably on cyclic treatment consisting of exposure to boiling water followed by exposure to hot dry air at 150° C. Ten cycles of such exposure produce accumulated shrinkage of almost 35% in the yarns or in fabrics prepared from the yarns.

In order to eliminate the tendency to shrink, a portion of the yarn is crystallized by exposure to high pressure steam. The yarn is placed in an autoclave on the package as obtained from the drawing process, and then treated with steam at 100 p.s.i. for one half hour. Following the steam treatment, a sample of this yarn is again examined by X-ray diffraction techniques and found to be crystalline. Samples of the crystalline fiber are subjected to cyclic wet and hot dry treatment simultaneously with an amorphous control fiber, and it is found that whereas the amorphous yarn shrinks cumulatively to almost 35% following ten cycles, the crystalline fibers show less than about 5% shrinkage even after ten cycles and the shrinkage is not cumulative.

EXAMPLE IV

The previous example has shown crystallization of a yarn from a wholly aromatic polyamide by treatment with steam. Another sample of this same amorphous yarn is subjected to a different crystallization treatment. Thus, the amorphous oriented yarn described in Example I is immersed in a mixture of dimethylacetamide and water (50–50) at the boiling point of the mixture for a period of 12 hours. The yarn, prior to this treatment, has a density of approximately 1.288 grams per cubic centimeter. Following exposure to the mixture of dimethylacetamide and water, the density of the yarn increases to 1.36 grams per cubic centimeter, and upon examination by X-rays the yarn is found to be highly crystalline. A sample of the yarn so treated is tested in comparison with a sample of amorphous yarn for constancy of elongation at different temperatures. FIGURE 5 shows the results of these tests. It will be seen that while the amorphous yarn has a constant elongatability-to-the-break up to a temperature of 150° C., the break-elongation above these temperatures increases considerably. The crystalline yarn, on the other hand, has initially a lower elongation and retains a constant elongation at temperatures as high as 300° C. For utilities in which exposure is limited to temperatures below 150° C., this change in properties is unimportant. However, as can readily be seen, for utilities which involve exposure under tension to temperatures in the range of 200–300° C., crystalline yarn is much superior. Similar experiments are performed in which yarn is crystallized with mixtures of dimethylformamide and water and with mixtures of water with dimethylacetamide or dimethylformamide in different proportions. Films of the polymer are also crystallized after orientation by similar treatments, with equivalent results. In all cases, exposure to the solvent-water mixture for periods of 4 hours or more produces a crystalline material. The greatest crystallinity is obtained with exposures from 12–24 hours.

EXAMPLE V

This example shows another procedure whereby oriented amorphous yarn prepared from poly(meta-phenylene isophthalamide) is crystallized. A sample of the yarn prepared as in Example I is crystallized by immersion in formic acid at 95° C. for 10 minutes. X-ray diffraction analysis shows that the yarn becomes highly crystalline during treatment and undergoes about 10% shrinkage upon treatment under conditions of no restraint. Formic acid used in these tests is highly concentrated (99%), although less concentrated acid, for example, 75%, is also satisfactory. This formic acid treatment is also useful as applied to films of wholly aromatic polyamides and also to staple fibers.

Crystallized yarns from wholly aromatic polyamides are particularly suited for certain utilities because of their unique physical properties. For example, because of their resistance to shrinkage under cyclic treatments of hot wet and hot dry, fabrics from these polymers are outstandingly useful for covers for laundry pressing machines and other similar applications.

When staple fibers of wholly aromatic polyamides are crystallized in a crimped or distorted condition, the crystallization stabilizes the existing distortions. When amorphous filaments or staple yarns of wholly aromatic polyamides are woven or knitted into fabrics and then crystallized in fabric form under either stretched or relaxed conditions, the fibers in the fabric are set in the configuration which the fabric geometry imposes upon them. The result is a highly stable fabric with a high degree of liveliness and wrinkle resistance and a very attractive crisp handle.

A fabric of this type was woven from three denier per filament, 1½ inch staple yarn of poly(metaphenylene isophthalamide) warp yarns 24–2's cotton count, 20 Z twist singles and 16 S twist implying, filling yarns 15–1's cotton count, 13 Z twist, in a plain weave 48 x 46 construction. The material in the fabric was then crystallized with formic acid as already described giving a 53 x 53 final finished construction. The fabric was approximately 5.8 ounces per square yard and was a very attractive worsted suiting with unusual liveliness.

EXAMPLE VI

A quantity of the continuous filaments of Example I in the amorphous oriented state is crimped mechanically in a stuffer box crimper, cut into staple fibers of 3" length, and deposited loosely on a tray. The fibers are subjected, in this crimped relaxed state, to the action of concentrated formic acid at 95° C. for 15 minutes. The treatment crystallizes the fibers and stabilizes them in the crimped state, producing a staple fiber of superior crimp-retentive behavior which can be spun into a yarn of 70 denier and woven into a fabric having an exceptionally full, lofty handle.

The low temperature, solvent polymerization technique illustrated in Examples I and II may be utilized to form all the aromatic polyamides of this invention. In this process an aromatic diacid halide and an aromatic diamine, as defined herein, are condensed to a high molecular weight linear polyamide having a recurring structural unit corresponding to the diamine and diacid chloride. The process is carried out in the presence of an organic acid acceptor and in a liquid reaction medium which is a solvent for each of the reactants and for the acid acceptor and which medium has an average solute-solvent interaction energy ($K_{av}$) with complementary model compounds as defined hereinafter, of less than about 1100 calories per mole. The energy in calories per mole of solute-solvent inter-action between the medium employed containing the concentration of organic acid-acceptor salt that will form in the proposed polymerization and a complementary model compound is determined according to the expression:

$$4.57T \log_{10} \frac{1}{x_2} = \Delta H_f \left(1 - \frac{T}{T_m}\right) + K(1-x_2)^2$$

wherein K is the energy in calories per mole of solute-solvent interaction between a model compound and the medium, T is the temperature in degrees absolute required to form a clear solution of a model compound in the medium at mole fraction concentration $x_2$, $T_m$ is the melting point of the model compound in degrees absolute and $\Delta H_f$ is the heat of fusion of the model compound in calories per mole.

By the term "complementary model compounds" is meant low molecular weight diamides devoid of terminal polyamide-forming groups and having the formulas:

(a) 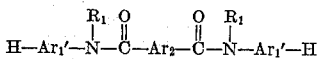

(b) 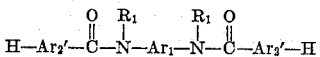

wherein $R_1$ is hydrogen or a lower alkyl group and $Ar_1$ and $Ar_2$ are divalent aromatic radicals as previously described, each such radical corresponding to a recurring unit in the polymer to be prepared. $Ar_1'$ and $Ar_2'$ correspond to $Ar_1$ and $Ar_2$, respectively, except that $Ar_1'$ and $Ar_2'$ are always single ring aromatic radicals (such as phenyl, alkyl phenyl, alkoxy phenyl, etc.) free from nitro, sulfo, halogen, and aromatic substituent groups. When $Ar_1$ and $Ar_2$ contain the latter substituent groups, $Ar_1'$ and $Ar_2'$ correspond to $Ar_1$ and $Ar_2$ with those groups absent. Typical model compounds of Formula a are:

(1) 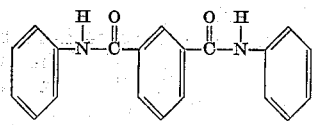

(2) 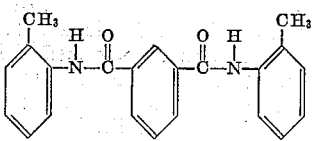

(3) 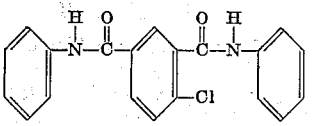

(4) 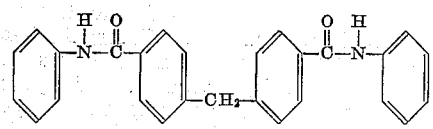

Typical compounds of Formula b, complementary to 1, 2, 3, and 4 listed above are:

(5) 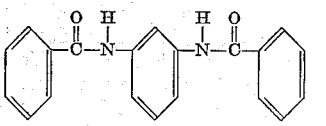

(6) 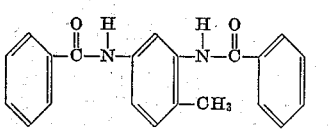

In accordance with the previous definition, compounds 1, 3 and 4 are complementary to 5, and compound 2 is complementary to 6. Many other complementary pairs are possible, the above being merely illustrative.

The following examples further illustrate the solution process for preparing polymers of this invention. The heat of fusion as reported in the examples is the thermal energy in calories necessary to change one mole of the compound from the solid state to the liquid state at the melting temperature. Suitable methods for the measurement of this property are described in "An Advanced Treatise on Physical Chemistry," volume III—"The Properties of Solids," pages 466–471, by J. R. Partington (Longmans, Green and Company, New York, 1952). Melting point determinations are made by conventional procedures such as described in "The Systematic Identification of Organic Compounds," pages 85–87, by R. L. Schriner and R. E. Fuson (John Wiley and Sons, New York, third edition, 1940). The temperature in degrees absolute required to form a clear solution of a model compound in the chosen medium at mole fraction concentration $x_2$ is determined by choosing a suitable concentration level and gradually warming the mixture of model compound and solvent in a sealed tube with agitation until a clear solution is obtained. The inherent viscosity values of the polymers are given as an indication of the degree of polymerization obtained. In view of the relative ease with which these values are determined they provide a useful method of evaluating the effect of process solvent variation on the polymerization. The values may be misleading when used to compare different types of polymers but in general aromatic polymers of the class defined herein have an inherent viscosity of at least about 0.6 in sulfuric acid and a melt temperature of at least 300° C. Such polymers may be used as films, in coating compositions and in paint formulae. Polymers having an inherent viscosity of at least 0.8 are particularly valuable because they can be formed into fibers. Inherent viscosity values are determined by measuring viscometer flow periods at 30.0±0.1° C. for sulfuric acid (sp. g. 1.841 at 60° F.) and for a solution of the polymer in sulfuric acid at a concentration of 0.5 gram per 100 cubic centimeters of solution. The inherent viscosity value is then calculated as 2 times the natural logarithm of the relative viscosity of the solution compared to that of the pure solvent. Polymer melt temperature is the minimum temperature at which a sample of the polymer leaves a wet, molten trail as it is stroked with moderate pressure across a smooth surface of a heated block.

EXAMPLE VII

In the preparation of a fiber-forming polyamide of high melting point from meta-phenylene diamine and isophthaloyl chloride in the presence of triethylamine as acid acceptor, the suitability of dimethylcyanamide as a reaction medium is determined using complementary model compounds 1 and 5, respectively. Model compound 5 is found to have a melting point of 244° C., a heat of fusion of 11,900 calories per mole and a 1.0 mole percent concentration forms a clear solution at 93° C., Substituting in the formula previously presented the energy of solute-solvent interaction (K) is determined to be —130 calories per mole.

Model compound 1 is found to have a melting point of 288.5° C., a heat fusion of 11,400 calories per mole, a 0.99 mole percent concentration gives a clear solution at 124° C., and substituting in the formula the solute-solvent interaction energy (K) is determined to be +310 calories per mole.

From the above the average solute-solvent inter-action energy of the complementary model compounds (Kav) is +90 calories per mole. Since this value is no greater than the limit of about 1100 calories per mole as previously noted, the medium is suitable for preparation of fiber-forming polymers of high melting point from the monomers selected.

The poly(meta-phenylene isophthalamide) is prepared as follows: 1.081 parts of meta-phenylene diamine and 2.04 parts of triethylamine are dissolved in 42 parts of dimethylcyanamide in a round-bottom flask. 2.03 parts of solid isophthaloyl chloride is dissolved in the previously formed solution with moderate stirring. After about one minute, precipitation of polymer occurs. This slurry is stirred for 10 minutes and then poured into water. A 100% yield of poly(meta-phenylene isophthalamide) having an inherent viscosity of 0.81 is formed. Structure of the polymer is confirmed by infrared spectra. A film produced from this polymer by casting from solution has a polymer melt temperature of 375° C.

EXAMPLE VIII

Tetramethylene sulfone is evaluated as a reaction medium for reacting the compounds of Example VII using N-methyl-morpholine as the acid acceptor. The same model compounds as employed in Example VII are used. The values of T, $x_2$, and K and Kav are given in the table below.

Table 6

|  | Model compounds | |
|---|---|---|
|  | 1 | 5 |
| T-273 | 128 | 119 |
| $x_2$ | 0.97 | 4.94 |
| K | +440 | -600 |

NOTE.—Kav: -80 calories/mole.

This value of Kav being less than the maximum value of about 1100 calories per mole classifies the solvent as among the reaction media defined by the present invention.

In the preparation of the polymer 2.196 parts of meta-phenylene diamine and 4.10 parts of methylmorpholine are dissolved in 63.5 parts of tetramethylene sulfone, the solution being made in an Erhlenmeyer flask equipped with a magnetic stirrer. 4.06 parts of isophthaloyl chloride in 63.5 parts of tetramethylene sulfone is added to the previously prepared solution over a period of 3 minutes. An additional 25.4 parts of tetramethylene sulfone is used as a rinse for acid chloride. A clear solution forms. It becomes viscous as polymerization proceeds with slight elimination of heat. At the end of 10 minutes, the product is precipitated by addition of water. The fibrous flake material resulting is obtained in a 100% yield of poly-(meta-phenylene isophthalamide) having an inherent viscosity of 0.92.

When the above polymerization is repeated substituting 2,4-dimethyltetramethylene sulfone for tetramethylene sulfone and employing N,N'-diethylaniline in place of methylmorpholine as acid acceptor, a 100% yield of product is obtained which has an inherent viscosity of 1.2

When the above polymerization is repeated substituting dimethyltetramethylene sulfone for the tetramethylene sulfone as a reaction medium and substituting pyridine for methylmorpholine as acid acceptor, a product having an inherent viscosity of 0.8 is obtained. Triethylamine, used as the acceptor in this system, yielded 100% polymer with an inherent viscosity of 3.0.

EXAMPLE IX

Polymer is prepared by dissolving 1.98 parts of bis(4-aminophenyl)methane and 3.04 parts of diethylaniline in 56.6 parts of dimethyltetramethylene sulfone. To this mixture, 2.03 parts of isophthaloyl chloride dissolved in 34 parts of dimethyltetramethylene sulfone is added over a period of about 1 minute with rapid agitation. An additional 11.3 parts of solvent reaction medium is used as a rinse for the isophthaloyl chloride solution. The reaction mass is stirred for about 10 minutes producing a clear solution from which a fibrous product is precipitated when the solution is added to water. A 100% yield of poly(bis 4-phenylene)methane isophthalamide having an inherent viscosity of 1.4 and a polymer melt temperature of 400° C. is obtained.

Another batch of the same polymer is prepared except that a total of only 45.3 parts of reaction medium is employed. The very viscous clear solution which is obtained is wet-spun into fibers in a water bath maintained at 20° C. using a ten-hole spinneret, each orifice of which is 6 mil. in diameter. The fibers have an inherent viscosity of 2.51.

A solution of the polymer in dimethylformamide is dry-spun into a white and lustrous yarn having a tenacity of 4.1 grams per denier and a 20% elongation.

In another embodiment of the solution polymerization process of the present invention is carried out in the presence of excess acid salt of an organic tertiary amine. Generally it is desirable that the salt be of the same organic amine as is used as an acid acceptor. As much as a 500% excess or more over and above the acid salt which will form during the course of the reaction may be used without interfering with the normal course of the reaction. Conveniently, from about 50 to 100% excess of organic amine acid salt over and above that which will be theoretically formed during the course of the reaction is employed. The average solute-solvent interaction energy (Kav) is suitable for defining an acceptable solvent in this embodiment of the process. In solution polymerization reactions of this invention, the solute-solvent interaction energy (K) for each model compound is measured in the presence of the concentration of acid salt and model compound that will be present at the conclusion of the polymerization.

The following examples illustrate preparation of polymers of this invention by low temperature solvent polymerization in the presence of excess organic amine acid salt.

EXAMPLE X

Chloroform is a suitable reaction medium for the production of a fiber-forming aromatic polyamide of high polymer melt temperature from meta-phenylene diamine and isophthaloyl chloride using triethylamine as acid acceptor and from 30–100% excess of triethylamine hydrochloride. Complementary model compounds 1 and 5 whose melting points and heats of fusion are listed in Example VII above are employed. Since in the ultimate polymerization it is desired that the polymer concentration be 2.63 mole percent, the value of T of the solute-solvent interaction energy formula is determined at that mole percent concentration and in the presence of a triethylamine hydrochloride concentration of 10.5 mole percent. Model compound 1 forms a clear solution at 116° C. and substituting in the formula is calculated to possess a solute-solvent interaction energy (K) of —730 calories per mole. Model compound 5 forms a clear solution in the chloroform triethylamine hydrochloride solvent at 121° C., corresponding to a solute-solvent interaction energy (K) value of +10 calories per mole. The value of (Kav) is thus —360 calories per mole, well below the limit of about 1100 calories per mole.

In the polymerization of 500 ml. round bottom flask equipped with a low speed stirrer and dropping funnel is charged with 2.163 parts of meta-phenylene diamine, 4.09 parts triethylamine, 5.506 parts triethylamine hydrochloride and 54 parts of washed and dried chloroform (the free tertiary amine is the theoretical equivalent of hydrochloric acid to be liberated during the condensation reaction. 5.506 parts of amine salt represents a 100% excess of salt over that to be formed from the free amine). 4.06 parts of isophthaloyl chloride in 21 parts of chloroform is added from a dropping funnel over a period of 15 minutes, the slowly stirred reaction mixture being maintained at a temperature of below 30° C. An additional 4.5 parts of chloroform, used to wash the funnel is added to the reaction mixture. After 20 minutes, the reaction mass which is clear and extremely viscous is poured into petroleum ether, yielding a fibrous flake which is thereafter washed with hot water. A 99% yield of product, having an inherent viscosity of 1.9 and a polymer melt temperature above 300° C., is obtained.

EXAMPLE XI

Methylene chloride is a suitable reaction medium for the production of a fiber-forming aromatic polyamide of high polymer melt temperature from meta-phenylene diamine and isophthaloyl chloride using triethylamine as acid acceptor in the presence of a 50% excess of triethylamine hydrochloride. The complementary model compounds of Example X are employed. Since in the completed polymerization reaction mass it is desired that the polymer concentration be 0.62 mole percent, the value of T of the solute-solvent interaction energy formula is determined at that mole concentration and in the presence of a triethylamine hydrochloride concentration of 1.8 mole percent. Model compound 1 forms a clear solution at 103° C., corresponding to a solute-solvent interaction energy (K) of +40 calories per mole. Model compound 5 forms a clear solution in methylene chloride at 104.5° C. This represents a solute-solution interaction energy (K) of +600 calories per mole. The average solute-solvent interaction energy is, therefore, +320 calories per mole.

The polymerization is performed by placing 2.16 parts of meta-phenylene diamine, 4.08 parts of triethylamine, 2.5 parts of triethylamine hydrochloride, and 143 parts of methylene chloride in a Waring Blendor. 4.06 parts of isophthaloyl chloride dissolved in 129 parts of methylene chloride is added to the moderately stirred reaction mass over a period of 8 seconds, the reaction mass being maintained at 25° C. 14 additional parts of methylene chloride used to wash isophthaloyl chloride is added in two equal parts. A precipitate of polymer forms immediately. At the end of 7 minutes a volume of hexane equal to the volume of reaction mass is added to assist in precipitation of product. The polymer is obtained in 97% yield, having an inherent viscosity of 1.54 and a polymer melt temperature of 375° C.

EXAMPLE XII

Acetonitrile is a suitable reaction medium for the production of a fiber-forming aromatic polyamide of high polymer melt temperature from meta-phenylene diamine and isophthaloyl chloride using triethylamine as acid acceptor in the presence of 26% excess triethylamine hydrochloride. Using model compounds 1 and 5, the value of (Kav) is found to be +535 calories per mole based on the following observations:

|  | Model compounds | |
| --- | --- | --- |
|  | 1 | 5 |
| T−273 [1] | 113 | 101 |
| $x_2$ | 0.00510 | 0.00510 |
| K | +440 | +630 |

[1] Determined in the presence of 1.300 mole percent of triethylamine hydrochloride.

The polymerization technique of Example XI is employed with details as follows:

WARING BLENDOR CHARGE 2.16 parts m-phenylene diamine
4.08 parts triethylamine
1.5 parts triethylamine hydrochloride
117.5 parts acetonitrile (as diamine solvent)
4.06 parts isophthaloyl chloride
31.3 parts acetonitrile (as acid chloride solvent)
7.8 parts acetonitrile (as acid chloride wash)

The resulting polymer, having an inherent viscosity of 1.11 and a polymer melt temperature of 375° C., is obtained in a 99% yield.

When no excess triethylamine hydrochloride is used at a polymer concentration of 0.516 mole percent, giving a Kav on models 1 and 5 of +1100, the resulting polymer has an inherent viscosity of 0.6.

EXAMPLE XIII

Fiber-forming poly(meta-phenylene chloroisophthalamide) of high polymer melt temperature is prepared using methylene chloride as the reaction medium, in the presence of triethylamine as acid acceptor and in the presence of 100% excess triethylamine hydrochloride. Complementary model compounds are 3 and 5. In classifying the solvent with model compound 3 the following values are obtained:

$T_m - 273 = 246$
$\Delta H_f = 9300$ calories per mole
$T - 273 = 35$
$x_2 = 0.00910$
$K = -900$ calories per mole Model compound 5 is shown in Example XI above to have a K of +600 calories per mole in the same solvent.

In preparing the polymer, 7.12 parts of 4-chloroisophthaloyl chloride in 143 parts of methylene chloride is added to a Waring Blendor containing 5.43 parts of metaphenylene diamine dihydrochloride, 12.14 parts of triethylamine and 143 parts of methylene chloride. After stirring for 10 minutes, polymer having an inherent viscosity of 0.84 and a polymer melt temperature of 305° C. is obtained.

EXAMPLE XIV

A nuclear substituted aromatic polyamide of high molecular weight and high polymer melt temperature, the nuclear substituents being lower alkyl or lower alkoxy, can be prepared in the same reaction medium and under the same conditions as the unsubstituted polymer. For instance, methylene chloride using triethylamine as an acid acceptor and in the presence of 50% excess triethylamine hydrochloride is suitable for the preparation of poly(4-methyl meta-phenylene isophthalamide) since the same system is suitable for poly(meta-phenylenediamine isophthalamide) as shown in Example XI. The suitability of the system is confirmed by K value determinations on model compounds 5 and 6 as shown below:

|  | Model compounds | |
| --- | --- | --- |
|  | 5 | 6 |
| $T_m - 273$ | 244 | 227.5 |
| $\Delta H_f$, cal./mole | 11,900 | 13,100 |
| $T - 273$ [1] | 107 | 87 |
| $x_2$ | 0.00676 | 0.00676 |
| K, cal./mole | +620 | −110 |

[1] Measured in the presence of a 50% excess of salt (1.804 mole percent).

Since model 6 is at least as soluble as model 5 and the latter represents a system which will form high molecular weight poly(meta-phenylene isophthalamide) (see Example XI), the test with model 6 alone is adequate to show that a high molecular weight polyamide may be formed from 4-methyl meta-phenylene diamine and isophthaloyl chloride in the same solvent medium (methylene chloride plus 50% excess triethylamine hydrochloride).

Polymer is prepared in a 2-liter flask equipped with stirrer, condenser and dropping funnel. A charge of 7.32 parts of 4-methyl meta-phenylene diamine, 11.1 parts of triethylamine hydrochloride, 12.3 parts of triethylamine and 430 parts of methylene chloride is placed in the flask. A solution of 12.2 parts of isophthaloyl chloride in 500 parts of methylene chloride is added over a period of about 10 seconds. Moderate stirring is continued for three minutes after which additional portions of each reactant, i.e., (a) 7.32 parts of the diamine and 12.3 parts of triethylamine in 322 parts of methylene chloride and (b) 12.2 parts of the acid chloride in 322 parts of methylene chloride, are added simultaneously over a period of about 30 seconds. After 10 minutes, polymer having an inherent viscosity of 2.30 and a polymer melt temperature of 330° C. is obtained.

EXAMPLE XV

A solution of 6.1 parts of isophthaloyl chloride in 200 parts of methylene chloride is added to a Waring Blendor simultaneously with a solution of 6.33 parts of 4-methoxymetaphenylenediamine monohydrochloride and 12.1 parts of triethylamine in 200 parts of methylene chloride. After 10 minutes, polymer having an inherent viscosity of 0.84 and a polymer melt temperature above 300° C. is recovered. It is soluble in dimethylformamide from which strong, transparent, flexible films are formed by casting.

The polymers of this invention may also be prepared by a polymerization procedure wherein one or both of the reactants is a mixture of diamine or diacid chloride. According to this embodiment, reaction conditions and suitable reaction media are classified by determining the solute-solvent interaction energy (K) of a model of each reactant and the average interaction energy (Kav) while taking into consideration the proportion of reactant represented by each model. The example below illustrates the preparation of copolymers.

EXAMPLE XVI

A copolymer of meta-phenylene diamine and a mixture of isophthaloyl (80 mole percent) and terephthaloyl (20 mole percent) chlorides is prepared by simultaneously adding to a Waring Blendor a solution of 43.9 parts of isophthaloyl chloride, 10.98 parts of terephthaloyl chloride dissolved in 1600 parts of methylene chloride and a solution of 48.87 parts of meta-phenylene diamine hydrochloride, 109.3 parts of triethylamine in 1600 parts of methylene chloride. An additional 400 parts of methylene chloride is used for rinse purposes and added to the reaction mass. After 10 minutes, polymer having an inherent viscosity of 1.44 and a polymer melt temperature of 370° C. is formed.

36 parts of the polymer so prepared is dissolved in 114 parts of dimethylformamide and is extruded through a five-hole spinneret (orifice diameter of 0.004 inch) into a cross-flow air column, the wall temperature of which is maintained at 200° C. The yarn is collected at 158 feet per minute and is drawn 2.75 times its extruded length. It has a tenacity of 3.5 grams per denier, a break elongation of 34%, and an initial modulus of 55 grams per denier.

The above polymerization is repeated shifting the proportion of acids to provide 70 mole percent of isophthaloyl chloride and 30 mole percent of terephthaloyl chloride. The product has an inherent viscosity of 1.89. A film of 15 mil thickness is cast from a 15% solution of the polymer in dimethylformamide. The washed and dried structure shows excellent physical properties, particularly as indicated below:

| Temp., ° C. | Tensile strength (p.s.i.) | Modulus (p.s.i.) | Elongation (percent) |
|---|---|---|---|
| 20 | 14,600 | 640,000 | 4.05 |
| 150 | 9,850 | 390,000 | 11.8 |
| 200 | 8,100 | 400,000 | 12.3 |

EXAMPLE XVII

A copolymer having an inherent viscosity of 1.45 and a polymer melt temperature of 375° C., soluble in dimethylformamide, dimethylacetamide and in N-methyl pyrrolidone is prepared following the technique of Example XVI and employing 5.14 parts of meta-phenylene diamine dihydrochloride, 0.27 part of para-phenylene diamine dihydrochloride, and 6.06 parts of triethylamine dissolved in 150 parts of methylene chloride as one solution and 6.1 parts of isophthaloyl chloride in 150 parts of methylene chloride as the other solution.

EXAMPLE XVIII

While the invention has been specifically demonstrated in the examples above in terms of isophthaloyl chloride, any aromatic diacyl halide may be employed. The present example illustrates the use of terephthaloyl chloride as a reaction component. The suitability of dimethyltetramethylene sulfone for the preparation of a polyamide from meta-phenylene diamine and terephthaloyl chloride in the presence of triethylamine as acid acceptor is determined by use of appropriate model compounds as described previously. In the preparation of the polymer a solution of 4.06 parts of terephthaloyl chloride in 75 parts of dimethyltetramethylene sulfone is rapidly added to a solution of 2.16 parts of meta-phenylene diamine and 4.04 parts of triethylamine in 75 parts of dimethyltetramethylene sulfone in a Waring Blendor. Polymer precipitates and stirring is continued for ten minutes. The product has an inherent viscosity of 1.04 and a polymer melt temperature above 400° C. It is soluble in concentrated sulfuric acid and in N-methylpyrrolidone containing 5% lithium chloride.

As previously pointed out, the process of the present invention is applicable to the preparation of all "aromatic polyamides" as defined previously. In accordance with this process, designated herein as low temperature, solvent polymerization, condensation of aromatic diamine and the diacid halide of a dibasic aromatic acid is accomplished in the presence of an organic acid acceptor and in a liquid reaction medium which is a solvent for each of the reactants and preferably for the acid acceptor. In addition, the reaction medium must possess an average solute-solvent interaction energy with complementary model compounds of less than about 1100 calories per mole. While it is preferred that the reaction medium be inert toward the reactants employed, nevertheless, some reaction between reactants and reaction medium can be tolerated due to the fact that the polyamide formation to the fiber-forming stage is very rapid. The reaction medium may be a solvent for the polymer formed. This is convenient when it is desirable to form a shaped article by extrusion of the dissolved polymer and concomitant removal of the solvent. The use of complementary model compounds in the determination of the average energy in calories of solute-solvent interaction between the model and the reaction medium has been previously described in detail. In determining the temperature (T) necessary to form a clear solution of a model compound in a particular solvent the concentration to be employed should represent the concentration of polymer unit at the end of the polymerization reaction. If the liquid dissolves a large quantity of the model compound, a high concentration may be employed, for instance, in the range of 20 to 25 mole percent. If the model compound is only difficulty soluble, to avoid heating to a very high temperature, a lower concentration level, for instance, 1 to 2 mole percent is more desirable. In general, a concentration level of from about 1 to about 20 mole percent is usually suitable. As pointed out previously, this value is determined in the presence of the quantity of amine salt which it is calculated will be present at the end of the proposed polymerization. If the reaction is to be carried out in the presence of amine salt of greater concentration than that formed in the reaction, then such excess amine salt is also added to the solvent medium when determining solute-solvent interaction energies.

As illustrated in the examples, the reactants are combined in the reaction medium in the presence of an acid acceptor. Any conventional material of this type may be utilized. The most satisfactory acid acceptors are organic tertiary amines, containing not more than one cyclic structure attached to the amine nitrogen, whose base strengths are such that $pK_a \geq 5.25$ (measured in water)

where $$K_a = \frac{(OH_3^+)(R_3N)}{(R_3NH^+)} \text{ and } pK_a = -\log_{10} K_a$$

Effectively $pK_a$ is equal to the pH of the aqueous amine solution at the half titration point. Suitable acid acceptors include trimethylamine, triethylamine, ethylpiperidine, diethylbenzylamine, dimethylbenzylamine, ethylmorpholine, and methylmorpholine. Polyfunctional tertiary amines, for example, N,N,N',N'-tetramethylhexamethylenediamine, can be used as acid acceptors.

The method of combining the two reactants is not critical. Usually it is more convenient to dissolve the diamine and the acid acceptor in the reaction medium and then add the acid halide dissolved in a separate portion of the reaction medium to this first solution with agitation. Other techniques, however, may be used. For instance, the two reactants could be added simultaneously to an agitated solution of acid acceptor in reaction medium. Alternatively, the acid acceptor and acid halide might be metered simultaneously to the reaction medium having the diamine dissolved therein in such proportions that the acid acceptor would combine with hydrogen halide as liberated. Best results are achieved when rapid agitation is employed to mix the reactants. The precise degree of agitation is not critical, but in general, if the stirring is violent enough to produce visible turbulence in the liquid mass, a superior product can be obtained. Excellent results can be achieved with a "Lightnin" propellor-type stirrer or any commercial equivalent for large scale reactions. When the medium employed is a solvent for the polymer produced, milder stirring is frequently sufficient.

In general, the reactants are combined in the reaction medium in substantially equimolecular proportions. A critical balance of reactants is not necessary. Enough reaction medium should be present so that the concentration of reactants is not greater than about 35%. A lower concentration of reactants, for instance, as low as 0.1%, may be used. It is preferred that the polymerization occur within the range of concentration of about 1 to about 10% by weight. It has been observed that purity of reactants is conducive to the production of high molecular weight product. It is preferred that the reactants contain a minimum of impurities. While the reaction is essentially instantaneous, in general, it is preferred to continue agitation for 2 to 3 minutes to assure completion. Longer reaction periods may be employed without deleterious results. Usually, the product precipitates. However, as illustrated in the examples, the polymer may go into solution immediately in the reaction medium and can be recovered therefrom by conventional methods.

Usually, the reaction is carried out at room temperature. Lower temperatures, as low as $-50°$ C., may be employed to slow the reaction somewhat. Higher temperatures, as high as $100°$ C., are sometimes desirable. The process of the present invention produces a high quality product, generally having an inherent viscosity in sulfuric acid of above 1.0, in excellent yields. Yields ranging from 75 to 100% are not uncommon.

The polymers of this invention may be prepared by dissolving the reactants in solvents which are miscible or at least partially soluble with each other. The following examples illustrate preparation of these polymers by these procedures. All parts and percentages are by weight unless otherwise indicated. Viscosity of the polymer products was measured in concentrated sulfuric acid (sp. gr. 1.841 at $60°$ F.) at $30°$ C. at a concentration of 0.5 gram per 100 cc. of solution.

EXAMPLE XIX 2.554 parts of 4,6-diamino meta-xylene and 3.975 parts of sodium carbonate are dissolved in 100 parts of water. A separate solution of 3.807 parts of isophthaloyl chloride in 136 parts of 3,4-dimethyl tetramethylene sulfone is prepared. The diamine solution is placed in a Waring Blendor and is agitated rapidly. The acid chloride solution is then added and stirring is continued for 5 minutes. The reaction takes place at room temperature, and at the end of the reaction time the polymer is precipitated by the addition of water. Filtered and washed polymer is obtained in a yield which is 78.6% of theoretical, and the polymer has an inherent viscosity of 0.81. Melting point of the polymer is $352°$ C.

EXAMPLE XX

The procedure of Example XIX is followed except that instead of isophthaloyl chloride and acidic ingredient is terephthaloyl chloride. Proportions of reactants and of solvents are the same as described above. The reaction takes place in a Waring Blendor and at the end of 5 minutes the reaction is stopped by the addition of water. The polymer is precipitated and obtained with an inherent viscosity of 0.72 and a melting point of $365°$ C.

EXAMPLE XXI

A solution of 6.1 parts of 2,4-diamino toluene in 200 parts of water is placed in a Waring Blendor. An equivalent amount of sodium carbonate is added to the diamine solution prior to reaction. To this stirred solution is added a solution of 10.2 parts of terephthaloyl chloride in 44.4 parts of tetrahydrofuran. At the end of 10 minutes, the reaction is stopped, and the polymer is separated by filtration. The polymer is obtained in a yield which is 100% of theoretical and is found to have an inherent viscosity of 1.37. The polymer has a melt temperature above $305°$ C. Fibers are spun from a 15% solution of polymer in dimethylacetamide containing 5% lithium chloride. The tenacity of these fibers is 1.4 g.p.d. with an elongation of 96% at the break and an initial modulus of 32.

In the preparation of spinning solutions, such as described in the preceding example, it is sometimes found that carbon dioxide gas is dissolved in the solution. This condition may be due to the use of a carbonate salt as an acid acceptor during polymerization or the use of a carbonate as part of a post-polymerization treatment, such as described in copending application Serial No. 713,304 by Kwolek, Morgan and Sorenson, filed February 5, 1958, disclosing polymerization of wholly aromatic polyamides or, for example, may be a contaminant picked up by contact with the air. The presence of dissolved carbon dioxide in solutions to be spun into filaments and the like is undesirable because it frequently tends to cause formations of the voids in the solid filaments. This situation can be remedied by the addition of a small amount of calcium oxide to the spinning solution. The calcium oxide reacts with carbon dioxide to form calcium carbonate which in the small quantities usually encountered is not detrimental in any way to the spinning solution. Other equivalent chemicals, such as barium oxide or magnesium oxide, as well as bases such as calcium hydroxide, can also be used. If desired, the spinning solution which has been so treated with calcium oxide can then be carefully re-acidified with hydrochloric acid to form soluble calcium chloride and insoluble calcium carbonate.

In the preparation of spinning solutions as discussed above, it is sometimes desirable to remove a by-product halogen acid with anhydrous ammonia. This process results in the formation of ammonium chloride which is then removed by filtration. However, the filtration step sometimes leaves a turbid solution because of the presence of small amounts of very finely divided insoluble ammonium chloride. This turbidity can be removed by treating the spinning solution with an excess of propylene oxide which reacts with the ammonium chloride and converts it to soluble products. The exact nature of these products has not been observed, but the reaction occurs rapidly and leads to greater ease in the subsequent spinning operations.

EXAMPLE XXII

A solution is prepared containing 9.7 parts of 2,5-diaminotoluene dihydrochloride and 21.2 parts sodium carbonate acid acceptor in 150 parts of water. This aqueous solution is placed in a Waring Blendor and rapid agitation is started. A separate solution of 10.1 parts of isophthaloyl chloride in 155 parts of tetrahydrofuran is prepared and added to the rapidly stirred diamine solution. The reaction is allowed to continue for 10 minutes at the end of which time stirring is stopped and the polymer completely precipitated by the addition of an extra 100 parts of water. The polymer, after drying, is found to have an inherent viscosity of .67 and a melting point of 350° C. Yield of polymer is 98% of the theoretical.

EXAMPLE XXIII

A solution of 10.6 parts of 3,3'-dimethyl benzidine in 300 parts of water and 66.6 parts of tetrahydrofuran containing 10.6 parts of sodium carbonate is prepared. This solution is placed in a Waring Blendor and stirred rapidly. A solution of 10.1 parts of isophthaloyl chloride in 222 parts of tetrahydrofuran is added and agitation is continued for 10 minutes. At the end of this time the polymer is separated and washed. The dried polymer has an inherent viscosity in sulfuric acid of 1.70 and a melting point 365° C. Yield of polymer is 98% of the theoretical.

EXAMPLE XXIV

A solution of 5.95 parts of bis(4-aminophenyl)methane in 150 parts of water and 111 parts of tetrahydrofuran with 6.36 parts of sodium carbonate is prepared. This solution is rapidly agitated in a Waring Blendor and a solution of 6.06 parts of isophthaloyl chloride in 44.4 parts of tetrahydrofuran added. Agitation is continued for 10 minutes and at the end of that time polymer is separated and found to have an inherent viscosity of 1.86 and a melting point 350° C. The polymer is obtained in a 97% yield.

EXAMPLE XXV

A solution of 5.41 parts meta-phenylene diamine and 10.6 parts sodium carbonate in 150 parts water is placed in a Waring Blendor and a solution of 10.26 parts isophthaloyl chloride in 155 parts tetrahydrofuran added rapidly with moderate stirring. Agitation is continued for 10 minutes and the polymer formed is washed and separated by filtration. Dried polymer has a viscosity of 2.47 and a melting point 350° C. The polymer is obtained in 94% yield.

EXAMPLE XXVI

In a Waring Blendor 27.12 parts of 2,2'-di(4-aminophenyl)propane and 25.44 parts of sodium carbonate are mixed in 240 parts of water and 266 parts of tetrahydrofuran. This mixture is rapidly stirred while 24.36 parts of isophthaloyl chloride in 266 parts of tetrahydrofuran is added as quickly as possible. A thick emulsion results which is stirred for 7 minutes then transferred to a larger Waring Blendor. With rapid stirring, 1200 parts of water are added to break the emulsion and precipitate the polymer which appears in a fine easily filtered state. The polymer is washed three times with water and dried overnight at 75° C. in a vacuum oven. Polymer obtained is in 95% yield. Polymer viscosity is 1.2 measured in meta-cresol at 0.5% concentration. This polymer, when dissolved in a mixture of 90 parts of tetrahydrofuran and 10 parts of water, gives a solution having a solid content of about 24%, from which fibers can be spun. Melting point of the polymer is 375° C. Glass fabrics and wire coated with this polymer have excellent resistance to high temperatures.

EXAMPLE XXVII

In a standard Waring Blendor, 27.12 parts of 2,2'-di(4-aminophenyl)propane and 25.44 parts of sodium carbonate are mixed in 266 parts of tetrahydrofuran and 240 parts of water. This mixture is rapidly stirred while 24.36 parts of terephthaloyl chloride in 266 parts of tetrahydrofuran are added as rapidly as possible. A thick emulsion is obtained which is stirred for 6 minutes and then transferred to a larger Waring Blendor where additional water is added to precipitate the polymer. The polymer, after washing and drying, is obtained in 95% yield and has an inherent viscosity measured in meta-cresol of 1.8. The polymer obtained is dissolved in dimethylformamide to a concentration of 14% solids and from this solution a yarn can be spun. Yarns of this polymer, drawn to twice their original length in an atmosphere of steam at 30 lbs. pressure, have a tenacity of 3.6 g.p.d. with an elongation at the break of 28%.

EXAMPLE XXVIII

A solution of 74.5 parts bis(4-aminophenyl)sulfone and 89.54 parts diethylaniline acid acceptor in 850 parts dimethyl tetramethylene sulfone in a round bottom flask is stirred, and a solution of 60.9 parts isophthaloyl chloride in 398 parts dimethyl tetramethylene sulfone added dropwise. The reaction mixture is stirred until it becomes very viscous. Then the polymer is precipitated by the addition of an equal volume of a 1:1 mixture of acetone and water. The precipitated polymer is washed once with water, then with denatured alcohol and filtered, dried and collected. Polymer is obtained in 100% yield and has a polymer melt temperature in excess of 400° C. and an inherent viscosity of 1.53.

EXAMPLE XXIX

A solution of 14.9 parts bis(4-aminophenyl)sulfone and 17.9 parts diethylaniline in 170 parts dimethyl tetramethylene sulfone is placed in a round bottom flask equipped with a stirring rod and a dropping funnel. A separate solution of 12.18 parts terephthaloyl chloride in 114 parts dimethyl tetramethylene sulfone is added dropwise to the stirred diamine solution. The solution becomes viscous after a few minutes and is poured into water to precipitate the polymer. The precipitated polymer is filtered, washed with water and dried. The polymer is obtained in 100% yield with an inherent viscosity of 1.88 and has a melting temperature in excess of 360° C.

In the polymerization process described above and also the related processes described in copending application Serial No. 713,304 by Kwolek, Morgan and Sorenson, filed February 5, 1958, disclosing solution polymerization of wholly aromatic polyamides, the use of acid acceptors is discussed. These acceptors neutralize the halogen-acid formed during the polymerization process and usually generate an organic or inorganic salt, such as triethylamine hydrochloride, calcium chloride, or dimethylacetamide-hydrochloride. Residual portions of such acid-acceptor salts can be removed from polymer solutions of this type by the use of organic ethers, such as diethylether, dipropylether, and the like. The ether may be added either before or after polymerization is complete in such amounts that two liquid phases are formed, one of which is rich in ether containing a substantial fraction of the hydrochloride salt whose removal is desired. The presence of the two liquid phases makes it possible to remove substantially all of the undesired by-product either by successive extractions with ether or by continuous countercurrent extraction.

The following example illustrates preparation and properties of a biaxially oriented film of a copolymer of this invention.

EXAMPLE XXX

A film of copolymer of meta-phenylene diamine with 70 mole percent of isophthaloyl chloride and 30 mole percent of terephthaloyl chloride is prepared as in Example XVI. The film is placed in a two-way stretcher and sprayed from above and below with steam at 20 p.s.i. After 30 seconds, the film is pulled rapidly in both directions to produce a two-way drawn film similar to the film which is oriented by hot-rolling in two directions. The film is drawn 1.85 times its original length in the other direction. After this two-way orientation process, the film is tested and the following physical properties observed. Initial modulus (measured at 74° F.) in the direction of greater draw is 659,000 pounds/sq. in., and in the direction of lower draw is 413,000 pounds/sq. in. Tenacity (measured at 74° F.) in the direction of greater draw is 16,515 pounds/sq. in. at the break, and in the direction of lower draw is 13,697 pounds/sq. in. at the break. Elongation is measured under the same conditions and in the direction of greater draw is 24.7% while in the direction of the lower draw is 26.3%. Coating compositions comprising solutions of the above copolymer in dimethylformamide, where applied to glass fabrics or wire, or fabrics made from fibers of Example I, produce excellent high temperature stable heat insulating coatings.

EXAMPLE XXXI

N,N'-dimethyl metaphenylene diamine dioxalate in the amount of 6.324 parts is dissolved in a mixture of 75 parts water-ice, 12 parts of $Na_2CO_3$ and 44.4 parts of tetrahydrofuran in an "Osterizer" blender. To this diamine-salt solution is added a solution of 4.061 parts of isophthaloyl chloride in a mixture of 44 parts of benzene and 44 parts of tetrahydrofuran. The acid halide solution is added as rapidly as possible while the reactants are agitated. Stirring is continued for five minutes, at the end of which time the polymer precipitates, is filtered off, washed with water and dried at 70° C. The polymer is obtained in a yield of 56% of the theoretical. Inherent viscosity of the polymer is 1.16 (measured in concentrated sulfuric acid) and the polymer melt temperature is 320° C. The polymer is soluble in dimethylformamide, dimethylacetamide, and in N-methyl-pyrrolidone.

Because they retain fiber properties at elevated temperatures, fibers from the polymers of this invention can be used in high temperature applications along with heat-resistant resins and elastomers, such as polytetrafluoroethylene, fluoro-rubbers and silicone resins. Fabrics from aromatic polyamide fibers form a base material to which resins can be applied as a coating or impregnant; also, staple fibers can be mixed into a matrix of the resin to give a reinforced plastic material. Since these fibers melt at temperatures higher than some resins do, resins can be applied to them in molten form, or can be sintered after application as a solid powder, without damage to the fibers. Moreover, since the fibers retain good tensile properties at high temperatures, resins can be applied to the fabric in a continuous manner, its high strength permitting the fabric to be processed, e.g., run through a sintering furnace, without any need for supporting members. The products so obtained can be used at much higher temperatures than is possible with conventional fibers which decompose or melt below 300° C.

Solutions of polymers of this invention are valuable as varnishes, adhesives, wire-coatings, fabric-coatings, and similar products. Fabrics suitable as a substrate for the coatings of this invention include woven and non-woven fabrics made from fibers of glass, asbestos, polyethylene terephthalate, polyacrylonitrile, polyhexamethylene adipamide, and other nylons, cotton, wool, polytetrafluoroethylene and mixtures thereof. When applied to wood, metal, and ceramics, these solutions form strong, heat-resistant films which can withstand repeated flexing, hammer-blows and chemical attack. For example, a copolymer of the composition described in the second part of Example XV was dissolved in dimethylformamide to give a 25% solids solution. A cooper sheet was painted with solution and dried at 115° C. The result was a tightly adhering varnish-like coating which withstood flexing of the sheet through 180°, and even pounding with a hammer while the metal was held at a temperature of 300° C.

This application is a continuation-in-part of application Serial No. 642,928, filed February 28, 1957, by Hill, Kwolek and Sweeney.

The claimed invention:

1. A linear, fiber-forming, synthetic polycarbonamide wherein recurring carbonamide linkages are an integral part of the polymer chain from the class consisting of a homopolymer and a copolymer, the said homopolymer and copolymer consisting essentially of recurring units of the class consisting of

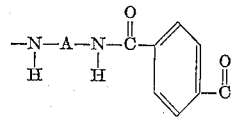

and

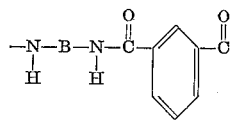

wherein —A— is

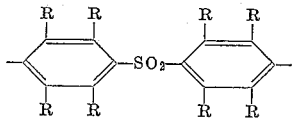

and —B— is a member of the class consisting of —A—

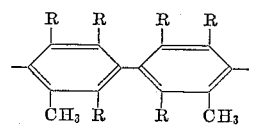

and

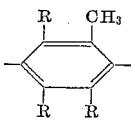

wherein —R is a member of the class consisting of hydrogen and lower alkyl, the total number of carbon atoms in substituent groups attached to any aromatic nucleus being no more than 9, and copolymeric units constituting no more than about 10% of the recurring polycarbonamide units, the said polycarbonamide having a melting point of at least about 350° C. and an inherent viscosity of at least about 0.6 in concentrated sulfuric acid at 30° C. at a concentration of 0.5% by weight.

2. A linear, fiber-forming, synthetic polycarbonamide consisting essentially of recurring units of the formula

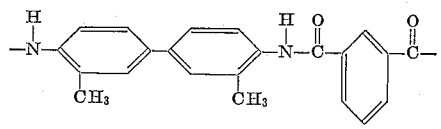

the said polycarbonamide having a melting point of at least about 365° C. and an inherent viscosity of at least about 0.6 in concentrated sulfuric acid at 30° C. at a concentration of 0.5% by weight.

3. A linear, fiber-forming, synthetic polycarbonamide consisting essentially of recurring units of the formula

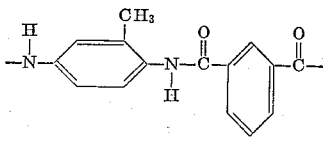

the said polycarbonamide having a melting point of at least about 350° C. and an inherent viscosity of at least about 0.6 in concentrated sulfuric acid at 30° C. at a concentration of 0.5% by weight.

4. A linear, fiber-forming, synthetic polycarbonamide consisting essentially of recurring units of the formula

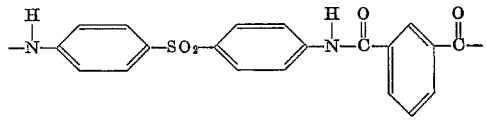

wherein the said polycarbonamide has a melting point of at least about 400° C. and an inherent viscosity of at least about 0.6 in concentrated sulfuric acid at 30° C. at a concentration of 0.5% by weight.

5. A linear, fiber-forming, synthetic polycarbonamide consisting essentially of recurring units of the formula

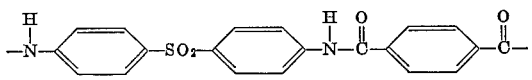

wherein the said polycarbonamide has a melting point of at least about 360° C. and an inherent viscosity of at least about 0.6 in concentrated sulfuric acid at 30° C. at a concentration of 0.5% by weight.

References Cited in the file of this patent

UNITED STATES PATENTS

| | | |
|---|---|---|
| 2,244,192 | Flory | June 3, 1941 |
| 2,252,554 | Carothers | Aug. 12, 1941 |
| 2,277,125 | Martin | Mar. 24, 1942 |
| 2,621,168 | Ross et al. | Dec. 9, 1952 |
| 2,625,536 | Kirby | Jan. 13, 1956 |
| 2,756,221 | Caldwell | July 24, 1956 |
| 2,766,222 | Lum et al. | Oct. 9, 1956 |
| 2,831,834 | Magat | Apr. 22, 1958 |

FOREIGN PATENTS

| | | |
|---|---|---|
| 1,112,203 | France | Nov. 9, 1955 |
| 745,029 | Germany | Feb. 23, 1944 |
| 614,625 | Great Britain | Dec. 30, 1948 |
| 632,997 | Great Britain | Dec. 5, 1949 |

OTHER REFERENCES

Hill et al.: J. Polymer Science, vol. 3, 1948, pages 609, 618–623, 629.

Edgar et al.: J. Polymer Science, vol. 8, 1952, pages 1–20.